United States Patent
Wasserman et al.

(10) Patent No.: US 12,533,512 B2
(45) Date of Patent: Jan. 27, 2026

(54) FLEXIBLE TRANSDUCER ARRAYS WITH A POLYMER INSULATING LAYER FOR APPLYING TUMOR TREATING FIELDS (TTFields)

(71) Applicant: Novocure GmbH, Root (CH)

(72) Inventors: Yoram Wasserman, Haifa (IL); Stas Obuchovsky, Haifa (IL); Nataliya Kuplennik, Haifa (IL)

(73) Assignee: NOVOCURE GMBH, Baar (CH)

( * ) Notice: Subject to any disclaimer, the term of this patent is extended or adjusted under 35 U.S.C. 154(b) by 0 days.

(21) Appl. No.: 17/362,966

(22) Filed: Jun. 29, 2021

(65) Prior Publication Data

US 2021/0402179 A1     Dec. 30, 2021

Related U.S. Application Data

(60) Provisional application No. 63/146,516, filed on Feb. 5, 2021, provisional application No. 63/083,557, filed on Sep. 25, 2020, provisional application No. 63/046,337, filed on Jun. 30, 2020.

(51) Int. Cl.
*A61N 1/00*     (2006.01)
*A61N 1/36*     (2006.01)
*A61N 1/375*    (2006.01)

(52) U.S. Cl.
CPC ....... *A61N 1/36002* (2017.08); *A61N 1/3752* (2013.01)

(58) Field of Classification Search
None
See application file for complete search history.

(56) References Cited

U.S. PATENT DOCUMENTS

| | | | |
|---|---|---|---|
| 4,722,761 A * | 2/1988 | Cartmell | A61B 18/16 600/397 |
| 5,092,720 A | 3/1992 | Abysov et al. | |
| 6,271,294 B1 | 8/2001 | Lasson et al. | |
| 6,852,416 B2 | 2/2005 | Zhang et al. | |

(Continued)

FOREIGN PATENT DOCUMENTS

| CN | 1703258 | 11/2005 |
|---|---|---|
| CN | 1976738 | 6/2007 |

(Continued)

OTHER PUBLICATIONS

Li, J., "Nanocomposites Based on Ferroelectric Polymers for Electrical Energy Storage," Thesis in Materials Science and Engineering, The Pennsylvania State University (2009) (Year: 2009).*

(Continued)

*Primary Examiner* — Niketa Patel
*Assistant Examiner* — Anant A Gupta
(74) *Attorney, Agent, or Firm* — Ballard Spahr LLP

(57) ABSTRACT

Described herein are devices for applying an alternating electric field to a living subject or an in vitro medium at a frequency between 100 kHz and 500 kHz. Also described herein are methods of using the described devices for applying an AC electric field to a target region comprising rapidly dividing cells, e.g., cells associated with a variety of disorders or conditions. This abstract is intended as a scanning tool for purposes of searching in the particular art and is not intended to be limiting of the present disclosure.

23 Claims, 4 Drawing Sheets

(56) References Cited

U.S. PATENT DOCUMENTS

| | | | |
|---|---|---|---|
| 6,868,289 B2 | 3/2005 | Palti | |
| 7,078,101 B1 | 7/2006 | Ramotowski et al. | |
| 7,081,216 B2 | 7/2006 | Amin-Sanayei | |
| 7,375,159 B2 | 5/2008 | Pascal | |
| 7,565,205 B2 | 7/2009 | Palti | |
| 7,769,468 B2 | 8/2010 | Turner et al. | |
| 8,004,771 B2 | 8/2011 | Choi et al. | |
| 8,170,684 B2 * | 5/2012 | Palti | A61N 1/0492 607/152 |
| 8,175,698 B2 | 5/2012 | Palti | |
| 8,178,179 B2 | 5/2012 | Bonnet et al. | |
| 8,182,912 B2 | 5/2012 | Bonnet et al. | |
| 8,552,127 B2 | 10/2013 | Bauer | |
| 8,609,756 B2 | 12/2013 | Baert et al. | |
| 8,642,702 B2 | 2/2014 | Abusleme et al. | |
| 8,706,261 B2 | 4/2014 | Palti | |
| 8,715,203 B2 | 5/2014 | Palti | |
| 8,869,542 B2 | 10/2014 | Zhang et al. | |
| 8,959,761 B2 | 2/2015 | Jung et al. | |
| 8,970,513 B2 | 3/2015 | Kwon et al. | |
| 8,981,358 B2 | 3/2015 | Cho et al. | |
| 9,053,617 B2 | 6/2015 | Ramstein et al. | |
| 9,142,754 B2 | 9/2015 | Jiang | |
| 9,164,586 B2 | 10/2015 | Zellers et al. | |
| 9,170,650 B2 | 10/2015 | Ramstein et al. | |
| 9,183,710 B2 | 11/2015 | Zellers et al. | |
| 9,219,126 B2 | 12/2015 | Whiting et al. | |
| 9,220,811 B2 | 12/2015 | Overstreet et al. | |
| 9,290,587 B2 | 3/2016 | Bauer | |
| 9,312,412 B2 | 4/2016 | O'Brien et al. | |
| 9,357,312 B2 | 5/2016 | Ramstein et al. | |
| 9,434,797 B2 | 9/2016 | Amin-Sanayei | |
| 9,434,801 B2 | 9/2016 | Choi et al. | |
| 9,507,468 B2 | 11/2016 | Li et al. | |
| 9,555,583 B1 * | 1/2017 | Dirk | B33Y 10/00 |
| 9,685,295 B2 | 6/2017 | King et al. | |
| 9,705,068 B2 | 7/2017 | Zellers et al. | |
| 9,752,941 B2 | 9/2017 | Jeon et al. | |
| 9,833,617 B2 | 12/2017 | Travers et al. | |
| 9,910,453 B2 | 3/2018 | Wasserman et al. | |
| 10,030,087 B2 | 7/2018 | Chernysheva et al. | |
| 10,088,936 B2 | 10/2018 | Zellers et al. | |
| 10,193,053 B2 | 1/2019 | Otera | |
| 10,199,384 B2 | 2/2019 | Domingues et al. | |
| 10,305,023 B2 | 5/2019 | Aliane et al. | |
| 10,312,215 B2 | 6/2019 | Kim et al. | |
| 10,318,051 B2 | 6/2019 | Choi et al. | |
| 10,322,381 B2 | 6/2019 | Kosar et al. | |
| 10,374,074 B2 | 8/2019 | Bae et al. | |
| 10,377,843 B2 | 8/2019 | Dossi et al. | |
| 10,400,097 B2 | 9/2019 | Bonnet et al. | |
| 10,413,940 B2 | 9/2019 | De Wijs et al. | |
| 10,435,579 B2 | 10/2019 | De Campo et al. | |
| 10,450,657 B2 | 10/2019 | Cojocaru et al. | |
| 10,459,549 B2 | 10/2019 | Kho et al. | |
| 10,488,935 B2 | 11/2019 | Kim et al. | |
| 10,498,259 B2 | 12/2019 | Aliane | |
| 10,507,325 B2 | 12/2019 | Simon et al. | |
| 10,532,340 B2 | 1/2020 | Stabler et al. | |
| 10,533,109 B2 | 1/2020 | Zheng et al. | |
| 10,570,231 B2 | 2/2020 | Amin-Sanayei | |
| 10,584,189 B2 | 3/2020 | Sodano | |
| 10,597,551 B2 | 3/2020 | Carella et al. | |
| 10,615,405 B2 | 4/2020 | Chauveau et al. | |
| 10,626,285 B2 | 4/2020 | Domingues et al. | |
| 10,633,468 B2 | 4/2020 | Liu et al. | |
| 10,671,225 B2 | 6/2020 | Jung et al. | |
| 10,688,447 B2 | 6/2020 | Sanguineti et al. | |
| 10,714,675 B2 | 7/2020 | Cho et al. | |
| 10,730,979 B2 | 8/2020 | Lannuzel et al. | |
| 10,840,542 B2 | 11/2020 | Abusleme et al. | |
| 11,620,881 B2 | 4/2023 | Choi | |
| 2004/0162602 A1 * | 8/2004 | Cohen | A61N 1/0492 607/142 |
| 2007/0167590 A1 * | 7/2007 | Baras | C08F 214/22 526/250 |
| 2008/0058454 A1 | 3/2008 | Chung | |
| 2010/0179621 A1 | 7/2010 | Palti | |
| 2010/0255378 A1 | 10/2010 | Bonnet et al. | |
| 2011/0110015 A1 | 5/2011 | Zhang et al. | |
| 2012/0329923 A1 | 12/2012 | Yen et al. | |
| 2013/0122309 A1 | 5/2013 | Zheng et al. | |
| 2013/0190847 A1 | 7/2013 | Palti | |
| 2015/0287906 A1 | 10/2015 | Zhang et al. | |
| 2015/0307673 A1 | 10/2015 | Dos Santos et al. | |
| 2015/0372235 A1 | 12/2015 | Noh | |
| 2016/0018893 A1 | 1/2016 | Choi et al. | |
| 2016/0046746 A1 | 2/2016 | Ameduri et al. | |
| 2016/0215133 A1 | 7/2016 | Bonnet et al. | |
| 2016/0215134 A1 | 7/2016 | Bonnet et al. | |
| 2016/0244910 A1 | 8/2016 | Chauveau et al. | |
| 2016/0245964 A1 | 8/2016 | Fine et al. | |
| 2017/0137658 A1 | 5/2017 | Marrani et al. | |
| 2017/0141291 A1 | 5/2017 | Abdelkader et al. | |
| 2017/0173634 A1 | 6/2017 | Hashimoto et al. | |
| 2017/0238425 A1 | 8/2017 | Mathews et al. | |
| 2017/0281934 A1 * | 10/2017 | Giladi | A61N 1/32 |
| 2017/0306173 A1 | 10/2017 | Garcia-Miralles et al. | |
| 2017/0368731 A1 | 12/2017 | Devisme et al. | |
| 2018/0190896 A1 | 7/2018 | Wu et al. | |
| 2018/0356493 A1 | 12/2018 | Stapert et al. | |
| 2019/0030789 A1 | 1/2019 | Rhoads et al. | |
| 2019/0046065 A1 * | 2/2019 | Macur | A61N 1/046 |
| 2019/0062476 A1 | 2/2019 | Lannuzel et al. | |
| 2019/0099100 A1 | 4/2019 | Nishizawa et al. | |
| 2019/0117972 A1 | 4/2019 | Schmidt et al. | |
| 2019/0284423 A1 | 9/2019 | Bodkhe et al. | |
| 2019/0361531 A1 | 11/2019 | Choi | |
| 2019/0381727 A1 | 12/2019 | Avataneo et al. | |
| 2020/0087526 A1 | 3/2020 | Domingues et al. | |
| 2020/0095413 A1 | 3/2020 | McIlroy et al. | |
| 2020/0171297 A1 | 6/2020 | Kirson et al. | |
| 2020/0209973 A1 | 7/2020 | Kim et al. | |
| 2020/0209997 A1 | 7/2020 | Kim et al. | |
| 2020/0235283 A1 | 7/2020 | Domingues et al. | |
| 2020/0251657 A1 | 8/2020 | Jongman et al. | |
| 2020/0259261 A1 | 8/2020 | Xiao et al. | |
| 2020/0324107 A1 | 10/2020 | Nishizawa et al. | |
| 2020/0376785 A1 | 12/2020 | Sherman et al. | |
| 2021/0069487 A1 * | 3/2021 | Fukae | A61N 1/0404 |
| 2021/0376329 A1 | 12/2021 | Plee et al. | |
| 2022/0025205 A1 | 1/2022 | Hidalgo et al. | |
| 2022/0029198 A1 | 1/2022 | Hidalgo et al. | |
| 2022/0238960 A1 | 7/2022 | Jeong et al. | |

FOREIGN PATENT DOCUMENTS

| | | |
|---|---|---|
| CN | 106794347 | 5/2017 |
| CN | 109731217 | 5/2019 |
| CN | 110193141 | 9/2019 |
| EP | 1262497 | 10/2004 |
| EP | 0608939 | 4/2006 |
| EP | 1966810 | 1/2012 |
| EP | 2580294 | 2/2015 |
| EP | 1922340 | 12/2016 |
| EP | 2463926 | 1/2017 |
| EP | 3171419 | 5/2017 |
| EP | 2981561 | 8/2017 |
| EP | 2439563 | 2/2018 |
| EP | 3235016 | 4/2019 |
| EP | 3383616 | 10/2019 |
| EP | 3559126 | 10/2019 |
| EP | 3204435 | 12/2019 |
| EP | 2893423 | 1/2020 |
| EP | 3383964 | 1/2020 |
| EP | 3621998 | 3/2020 |
| EP | 3484933 | 4/2020 |
| EP | 3632334 | 4/2020 |
| EP | 3390470 | 5/2020 |
| EP | 3523335 | 7/2020 |
| EP | 3302779 | 9/2020 |
| EP | 3161061 | 11/2020 |
| EP | 3583143 | 11/2020 |

(56) References Cited

FOREIGN PATENT DOCUMENTS

| | | |
|---|---|---|
| EP | 3741785 | 11/2020 |
| GB | 626407 | 7/1949 |
| JP | 6573920 | 9/2019 |
| WO | WO 2012/088117 | 6/2012 |
| WO | WO 2014/056943 | 4/2014 |
| WO | WO 2015/163586 | 10/2015 |
| WO | WO 2015/174651 | 11/2015 |
| WO | WO 2016/016553 | 2/2016 |
| WO | WO 2016/039138 | 3/2016 |
| WO | WO 2016/047819 | 3/2016 |
| WO | WO 2016/205484 | 12/2016 |
| WO | WO 2017/093252 | 6/2017 |
| WO | WO 2018/050688 | 3/2018 |
| WO | WO 2018/073277 | 4/2018 |
| WO | WO 2018/147583 | 8/2018 |
| WO | WO 2018/169789 | 9/2018 |
| WO | WO 2018/193402 | 10/2018 |
| WO | WO 2018/193405 | 10/2018 |
| WO | WO 2018/208680 | 11/2018 |
| WO | WO 2019/053176 | 3/2019 |
| WO | WO 2019/084011 | 5/2019 |
| WO | WO 2019/221960 | 11/2019 |
| WO | WO 2020/008152 | 1/2020 |
| WO | WO 2020/016534 | 1/2020 |
| WO | WO 2020/021204 | 1/2020 |
| WO | WO 2020/070420 | 4/2020 |
| WO | WO 2019/225537 | 5/2020 |
| WO | WO 2020/104776 | 5/2020 |
| WO | WO 2020/109503 | 6/2020 |
| WO | WO 2020/109505 | 6/2020 |
| WO | 111481823 | 8/2020 |
| WO | WO 2020/165725 | 8/2020 |
| WO | WO 2020/251230 | 12/2020 |

OTHER PUBLICATIONS

U.S. Appl. No. 11/620,881, filed Apr. 4, 2023, Choi.

Bouharras, et al., Recent progress on core-shell structured BaTiO3 polymer nanocomposites for high energy storage: synthesis, dielectric properties and applications, 2020, Progress in Material Science, vol. 113, 100670.

Chu et al., PVDF-based copolymers, terpolymers, and their multi-component material systems for capacitor applications, 2008, The Pennsylvania State University, Department of Materials Science and Engineering.

Food and Drug Administration Neurological Devices Panel, Mar. 17, 2011, NovoCure Ltd., NovoTTF-100A System, PMA P10034.

Kirson, et al., Alternating electric fields arrest cell proliferation in animal tumor models and human brain tumors, PNAS, 2007, vol. 104, No. 24, pp. 10152-10157.

Li et al., Nanocomposites based on ferroelectric polymers for electrical energy storage, 2009, The Pennsylvania State University, Department of Materials Science and Engineering.

Soulestin et al., Vinylidene fluoride- and trifluoroethylene-containing fluorinated electroactive copolymers. How does chemistry impact properties? 2017, vol. 72, pp. 16-60.

Zhang et al., Colossal room-temperature electrocaloric effect in ferroelectric polymer nanocomposites using nanostructured barium strontium titanates, 2015, 9, 7, pp. 7164-7174.

* cited by examiner

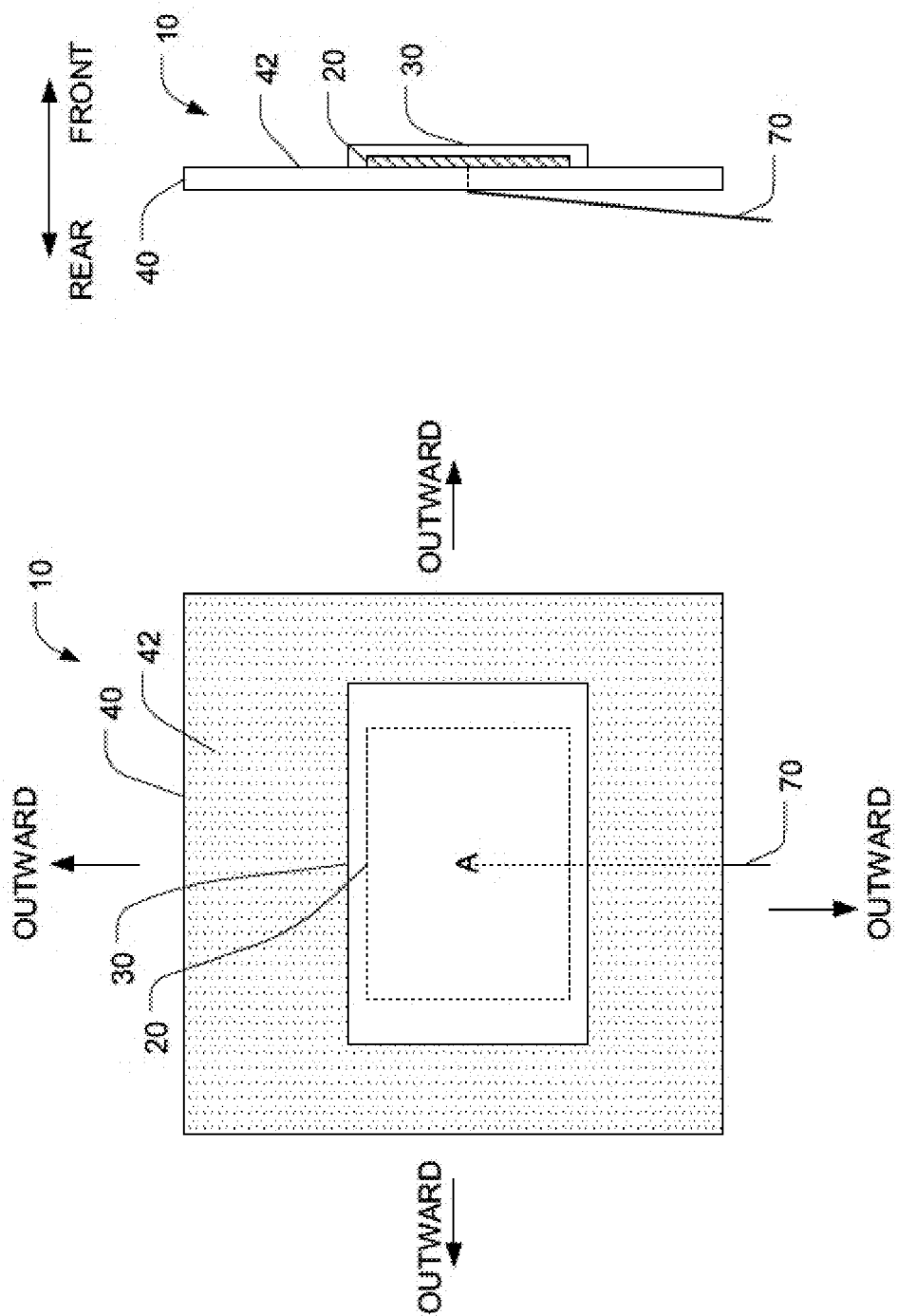

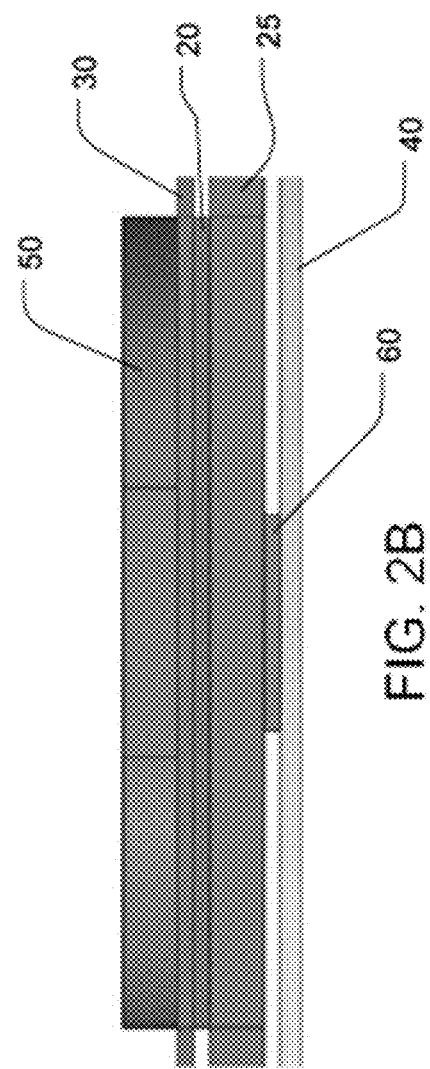
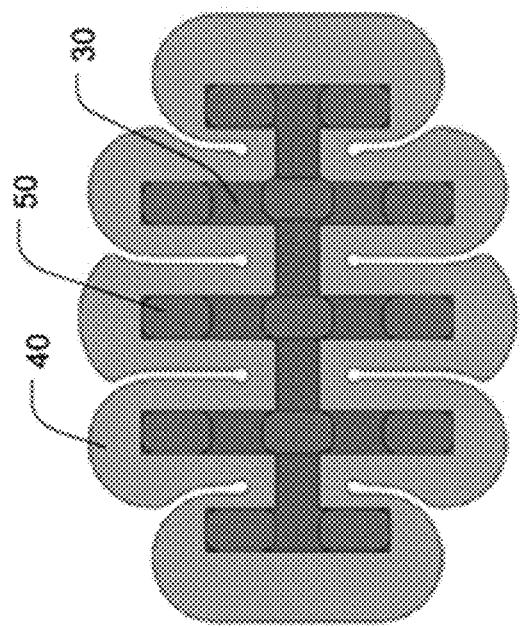
FIG. 2B
FIG. 2A

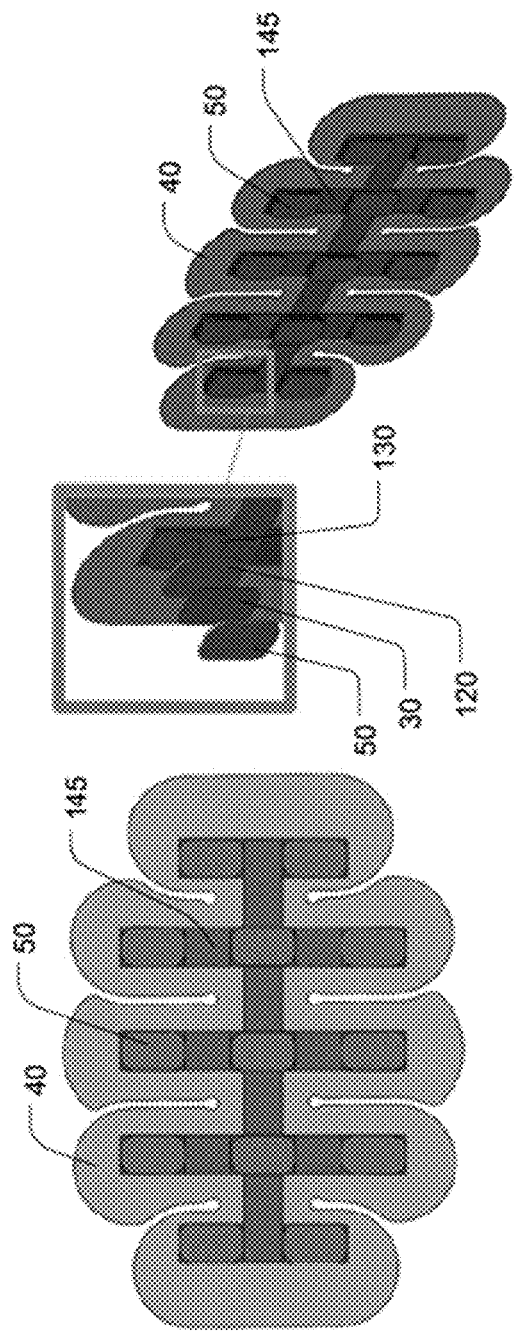
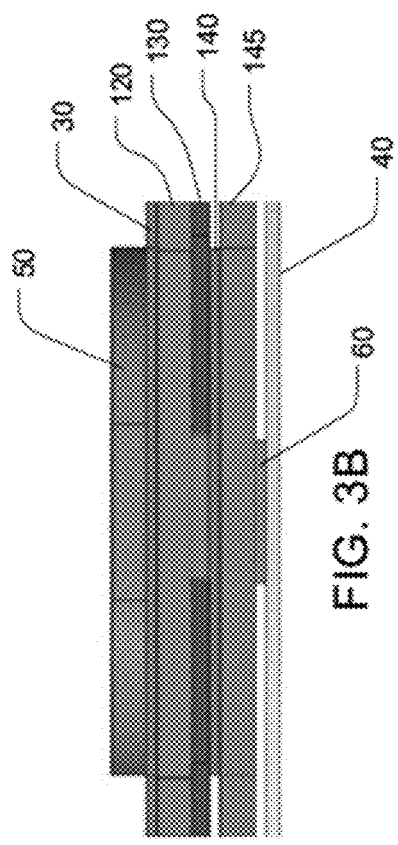
FIG. 3A
FIG. 3B
FIG. 3C

FLEXIBLE TRANSDUCER ARRAYS WITH A POLYMER INSULATING LAYER FOR APPLYING TUMOR TREATING FIELDS (TTFields)

CROSS-REFERENCE TO RELATED APPLICATIONS

This Application claims the benefit of U.S. Application No. 63/046,337, filed on Jun. 30, 2020; U.S. Application No. 63/083,557, filed on Sep. 25, 2020; and U.S. Application No. 63/146,516, filed on Feb. 5, 2021, the contents of which are hereby incorporated by reference in their entirety.

BACKGROUND

Tumor Treating Fields (TTFields) therapy is a proven approach for treating tumors, and the Optune® system is an apparatus that is used to deliver TTFields. Optune® uses four transducer arrays that are placed on the patient's skin in close proximity to a tumor (e.g., front, back, right, and left with respect to the tumor) to deliver an alternating electric field to the tumor. These transducer arrays are driven by an AC signal generator that operates at, e.g., 100-500 kHz.

U.S. Pat. No. 8,715,203 depicts a design for these transducer arrays that uses a plurality of ceramic discs. One side of each ceramic disc is positioned against the patient's skin, and the other side of each disc has a conductive backing. Electrical signals are applied to this conductive backing, and these signals are capacitively coupled into the patient's body through the ceramic discs. In some embodiments, the capacitance of each of these discs is at least 2 nF. In some embodiments the capacitance of each of these discs is at least 20 nF.

SUMMARY

Although the transducer arrays described in U.S. Pat. No. 8,715,203 are effective, those transducer arrays are relatively stiff because they are made using solid ceramic discs with diameters on the order of 2 cm and a thickness on the order of 1 mm. This stiffness can make it harder to position the transducer arrays in the desired location and/or can cause a mild degree of discomfort to the patient. Until now, using ceramic-based transducer arrays (with extremely high dielectric constants) was the only way to obtain a sufficiently high level of capacitance, which is necessary to effectively capacitively couple AC signals into the patient's body. More specifically, transducer arrays could heretofore not be built using a polymer insulating layer to capacitively couple an AC signal into the person's body, because all polymers' dielectric constants were much too low to provide a sufficient degree of capacitive coupling.

The embodiments described herein rely on polymer compositions that have significantly higher dielectric constants than conventional polymers. More specifically, for the first time, the dielectric constant of these recently discovered polymer compositions is high enough to build a transducer array (or a simple electrode) that can effectively capacitively couple an AC signal into a person's body through a polymer insulating layer.

One aspect of the invention is directed to a first apparatus for applying an alternating electric field to a living subject or an in vitro medium at a frequency between 100 kHz and 500 kHz. The first apparatus comprises a layer of conductive material having a front face with an area; a flexible polymer layer positioned against the front face of the conductive material so as to cover at least a portion of the area (including for example, the entire area), the polymer layer having a front face; and an electrical lead positioned in electrical contact with the layer of conductive material. The polymer layer comprises at least one of Poly(VDF-TrFE-CTFE), Poly(VDF-TrFE-CFE), and Poly(VDF-TrFE-CFE-CTFE).

Some embodiments of the first apparatus further comprise a flexible third layer positioned behind the layer of conductive material, the flexible third layer having a front face. At least a portion of the front face of the third layer is coated with an adhesive. A first region of the adhesive is positioned directly behind the layer of conductive material and supports the layer of conductive material. A second region of the adhesive is positioned outwardly with respect to the first region and is configured to (a) when pressed against a region of skin, adhere to the skin and hold the polymer layer adjacent to the skin, and (b) be easily removable from the skin. Optionally, these embodiments may further comprise a layer of conductive hydrogel disposed on the front face of the polymer layer. The layer of conductive hydrogel is positioned to make contact with the skin when the polymer layer is being held adjacent to the skin by the second region of the adhesive.

In some embodiments of the first apparatus, the polymer layer has a thickness of 20 μm or less, e.g., from 1 μm to 20 μm. In some embodiments of the first apparatus, the polymer layer has a thickness of 10 μm or less, e.g., from 1 μm to 10 μm. In further embodiments of the first apparatus, the polymer layer has a thickness of 5 μm or less, e.g., from 1 μm to 5 μm. In still further embodiments of the first apparatus, the polymer layer has a thickness of 3 μm or less, e.g., from 1 μm to 3 μm, or from 2 μm to 3 μm.

Another aspect of the invention is directed to a second apparatus for applying an alternating electric field to a living subject or an in vitro medium at a frequency between 100 kHz and 500 kHz. The second apparatus comprises a layer of conductive material having a front face, the front face having an area; a flexible polymer layer positioned against the front face of the conductive material so as to cover the area or at least a portion of the area, the polymer layer having a front face; and an electrical lead positioned in electrical contact with the layer of conductive material. At at least one frequency between 100 kHz and 500 kHz, the polymer layer has a dielectric constant of at least 20.

In some embodiments of the second apparatus, the polymer layer has a thickness of 20 μm or less in a direction perpendicular to the front face of the polymer layer, e.g., from 1 μm to 20 μm. In further embodiments of the second apparatus, the polymer layer has a thickness of 10 μm or less in a direction perpendicular to the front face of the polymer layer, e.g., from 1 μm to 10 μm. In other embodiments of the second apparatus, the polymer layer has a thickness of 5 μm or less in a direction perpendicular to the front face of the polymer layer, e.g., from 1 μm to 5 μm. In further embodiments of the second apparatus, the polymer layer has a thickness of 3 μm or less in a direction perpendicular to the front face of the polymer layer, e.g., from 1 μm to 3 μm.

In some embodiments of the second apparatus, the polymer layer has a dielectric constant of at least 20 at 200 kHz. In some embodiments of the second apparatus, the layer of conductive material comprises at least one metal, is flexible, and has a thickness of less than 0.1 mm in a direction perpendicular to the front face of the layer of conductive material.

Some embodiments of the second apparatus further comprise a flexible third layer positioned behind the layer of conductive material. The flexible third layer has a front face. At least a portion of the front face of the third layer is coated with an adhesive. A first region of the adhesive is positioned directly behind the layer of conductive material and supports the layer of conductive material. A second region of the adhesive is positioned outwardly with respect to the first region and is configured to (i) when pressed against a region of skin, adhere to the skin and hold the polymer layer adjacent to the skin, and (ii) be easily removable from the skin. These embodiments further comprise a layer of conductive hydrogel disposed on the front face of the polymer layer. The hydrogel is positioned to make contact with the skin when the polymer layer is being held adjacent to the skin by the second region of the adhesive.

Some embodiments of the second apparatus further comprise a flexible third layer configured to support the layer of conductive material. The flexible third layer has a front face. A first portion of the front face of the flexible third layer is coated with an adhesive that adheres to human skin and is easily removable from the skin. The first portion is positioned outwardly with respect to both the layer of conductive material and the polymer layer such that when the first portion is pressed against a region of skin, the adhesive on the first portion will adhere to the skin and hold the polymer layer adjacent to the skin. These embodiments further comprise a layer of conductive hydrogel disposed on the front face of the polymer layer. The hydrogel is positioned to make contact with the skin when the polymer layer is being held adjacent to the skin by the adhesive.

In some embodiments of the second apparatus, the polymer layer comprises at least one of Poly(VDF-TrFE-CTFE), Poly(VDF-TrFE-CFE), and Poly(VDF-TrFE-CFE-CTFE). In some embodiments of the second apparatus, the polymer layer comprises ceramic nanoparticles mixed into at least one of Poly(VDF-TrFE-CTFE) and Poly(VDF-TrFE-CFE). In some embodiments of the second apparatus, the polymer layer comprises barium titanate and/or barium strontium titanate ceramic nanoparticles mixed into at least one of Poly(VDF-TrFE-CTFE) and Poly(VDF-TrFE-CFE). In some embodiments of the second apparatus, the polymer layer comprises ceramic nanoparticles mixed into at least one of Poly(VDF-TrFE), P(VDF-HFP), PVDF. In some embodiments of the second apparatus, the polymer layer comprises barium titanate and/or barium strontium titanate ceramic nanoparticles mixed into at least one of Poly(VDF-TrFE), P(VDF-HFP), PVDF. In some embodiments of the second apparatus, ceramic nanoparticles are mixed into the polymer layer.

Another aspect of the invention is directed to a third apparatus for applying an alternating electric field to a living subject or an in vitro medium at a frequency between 100 kHz and 500 kHz. The third apparatus comprises a flex circuit that includes (a) a plurality of conductive pads positioned on a front side of the flex circuit, each of the conductive pads having a respective area, and (b) at least one conductive trace disposed in electrical contact with the plurality of conductive pads. The at least one conductive trace is arranged so that each of the conductive pads can be driven by an electrical signal. The third apparatus also comprises a plurality of flexible polymer regions, each of which has a front face and is disposed over and in front of a respective one of the conductive pads on the front side of the flex circuit. At at least one frequency between 100 kHz and 500 kHz, each of the polymer regions has a dielectric constant of at least 20. Each of the polymer regions has a thickness of 20 µm or less in a direction perpendicular to its front face.

In some embodiments of the third apparatus, each of the polymer regions independently has a thickness of 20 µm or less in a direction perpendicular to its front face, e.g., from 1 µm to 20 µm. In further embodiments of the third apparatus, each of the polymer regions independently has a thickness of 10 µm or less in a direction perpendicular to its front face, e.g., from 1 µm to 10 µm. In other embodiments of the third apparatus, each of the polymer regions independently has a thickness of 5 µm or less in a direction perpendicular to its front face, e.g., from 1 µm to 5 µm. In further embodiments of the third apparatus, each of the polymer regions independently has a thickness of 3 µm or less in a direction perpendicular to its front face, e.g., from 1 µm to 3 µm.

In some embodiments of the third apparatus, the plurality of polymer regions is printed, sprayed, or cast directly onto the plurality of conductive pads. In some embodiments of the third apparatus, each of the polymer regions has a thickness of 5 µm or less, e.g., from 1 µm to 5 µm. In some embodiments of the third apparatus, the areas of the plurality of conductive pads collectively add up to at least 25 cm$^2$.

Some embodiments of the third apparatus further comprise a plurality of thermistors positioned on a rear side of the flex circuit. Each of the plurality of thermistors is in thermal contact with a respective one of the plurality of conductive pads. The flex circuit further includes a plurality of conductive traces that provide access to the plurality of thermistors.

Some embodiments of the third apparatus further comprise a flexible third layer positioned behind the flex circuit. The flexible third layer has a front face. At least a portion of the front face of the third layer is coated with an adhesive. A first region of the adhesive is positioned directly behind the flex circuit and supports the flex circuit. A second region of the adhesive is positioned outwardly with respect to the first region and is configured to (i) when pressed against a region of skin, adhere to the skin and hold the plurality of polymer regions adjacent to the skin, and (ii) be easily removable from the skin. These embodiments further comprise a layer of conductive hydrogel disposed on the front face of each of the polymer regions. The hydrogel is positioned to make contact with the skin when each of the polymer regions is being held adjacent to the skin by the second region of the adhesive.

Some embodiments of the third apparatus further comprise a flexible third layer configured to support the flex circuit. The flexible third layer has a front face. A first portion of the front face of the flexible third layer is coated with an adhesive that adheres to human skin and is easily removable from the skin. The first portion is positioned outwardly with respect to the flex circuit such that when the first portion is pressed against a region of skin, the adhesive on the first portion will adhere to the skin and hold the plurality of polymer regions adjacent to the skin. These embodiments further comprise a layer of conductive hydrogel disposed on the front face of each of the polymer regions. The hydrogel is positioned to make contact with the skin when each of the polymer regions is being held adjacent to the skin by the adhesive.

Another aspect of the invention is directed to a fourth apparatus for applying an alternating electric field to a living subject or an in vitro medium at a frequency between 100 kHz and 500 kHz. The fourth apparatus comprises a flex circuit that includes (a) a plurality of conductive pads positioned on a front side of the flex circuit, and (b) at least one conductive trace disposed in electrical contact with the plurality of conductive pads. The at least one conductive trace is arranged so that each of the conductive pads can be driven by an electrical signal. The fourth apparatus also comprises a plurality of pieces of metal foil positioned in front of the flex circuit, each of the pieces having a front face having an area. Each of the pieces is electrically connected to a respective one of the conductive pads. The fourth apparatus also comprises a plurality of flexible polymer regions, each of which has a front face and is disposed over and in front of a respective one of the plurality of pieces of metal foil. At at least one frequency between 100 kHz and 500 kHz, each of the polymer regions has a dielectric constant of at least 20. Each of the polymer regions has a thickness of 20 µm or less in a direction perpendicular to its front face.

In some embodiments of the fourth apparatus, each of the polymer regions independently has a thickness of 20 µm or less in a direction perpendicular to its front face, e.g., from 1 µm to 20 µm. In further embodiments of the fourth apparatus, each of the polymer regions independently has a thickness of 10 µm or less in a direction perpendicular to its front face, e.g., from 1 µm to 10 µm. In other embodiments of the fourth apparatus, each of the polymer regions independently has a thickness of 5 µm or less in a direction perpendicular to its front face, e.g., from 1 µm to 5 µm. In further embodiments of the fourth apparatus, each of the polymer regions independently has a thickness of 3 µm or less in a direction perpendicular to its front face, e.g., from 1 µm to 3 µm.

In some embodiments of the fourth apparatus, each of the polymer regions has a thickness of less than 5 µm. In some embodiments of the fourth apparatus, the areas of the plurality of pieces of metal foil collectively add up to at least 25 cm$^2$.

Some embodiments of the fourth apparatus further comprise a plurality of thermistors positioned on a rear side of the flex circuit. Each of the plurality of thermistors is in thermal contact with a respective one of the plurality of pieces of metal foil. In these embodiments, the flex circuit further includes a plurality of conductive traces that provide access to the plurality of thermistors.

Some embodiments of the fourth apparatus further comprise a flexible third layer positioned behind the flex circuit, the flexible third layer having a front face. At least a portion of the front face of the third layer is coated with an adhesive. A first region of the adhesive is positioned directly behind the flex circuit and supports the flex circuit. A second region of the adhesive is positioned outwardly with respect to the first region and is configured to (i) when pressed against a region of skin, adhere to the skin and hold the plurality of polymer regions adjacent to the skin, and (ii) be easily removable from the skin. These embodiments further comprise a layer of conductive hydrogel disposed on the front face of each of the polymer regions. The hydrogel is positioned to make contact with the skin when each of the polymer regions is being held adjacent to the skin by the second region of the adhesive.

Some embodiments of the fourth apparatus further comprise a flexible third layer configured to support the flex circuit, the flexible third layer having a front face. A first portion of the front face of the flexible third layer is coated with an adhesive that adheres to human skin and is easily removable from the skin. The first portion is positioned outwardly with respect to the flex circuit such that when the first portion is pressed against a region of skin, the adhesive on the first portion will adhere to the skin and hold the plurality of polymer regions adjacent to the skin. These embodiments further comprise a layer of conductive hydrogel disposed on the front face of each of the polymer regions. The hydrogel is positioned to make contact with the skin when each of the polymer regions is being held adjacent to the skin by the adhesive.

In the second, third, or fourth embodiments, each of the polymer regions may comprise at least one of Poly(VDF-TrFE-CTFE), Poly(VDF-TrFE-CFE), and Poly(VDF-TrFE-CFE-CTFE). In the second, third, or fourth embodiments, each of the polymer regions may comprise ceramic nanoparticles mixed into at least one of Poly(VDF-TrFE-CTFE) and Poly(VDF-TrFE-CFE). In the second, third, or fourth embodiments, each of the polymer regions may comprise ceramic nanoparticles mixed into at least one of Poly(VDF-TrFE-CTFE) and Poly(VDF-TrFE-CFE), wherein the ceramic nanoparticles comprise at least one of barium titanate and barium strontium titanate. In the second, third, or fourth embodiments, each of the polymer regions may comprise ceramic nanoparticles mixed into at least one of Poly(VDF-TrFE), P(VDF-HFP), PVDF. In the second, third, or fourth embodiments, each of the polymer regions may comprise ceramic nanoparticles mixed into at least one of Poly(VDF-TrFE), P(VDF-HFP), PVDF, wherein the ceramic nanoparticles comprise at least one of barium titanate and barium strontium titanate. In the second, third, or fourth embodiments, ceramic nanoparticles may be mixed into each of the polymer regions.

Another aspect of the disclosure relates to a method of selectively destroying or inhibiting the growth of rapidly dividing cells located within a target region of a subject or an in vitro medium. The method involves positioning a first apparatus as described herein at a first location near the target region; positioning a second apparatus as described herein at a second location near the target region, wherein the second location opposes the first location; and applying an AC voltage between the first apparatus and the second apparatus, thereby imposing an AC electric field in the target region, wherein the frequency of the AC electric field ranges from 100 kHz to 500 kHz, and wherein when the AC electric field is imposed in the target region for a duration of time, the AC electric field selectively destroys or inhibits the growth of rapidly dividing cells within the target region. The first apparatus and the second apparatus can be the same in terms of structure and components or they can be different.

A further aspect of the disclosure relates to a method for selectively destroying or inhibiting the growth of rapidly dividing cells in a target region, comprising providing a first apparatus as described herein for placement at a first location near the target region; providing a second apparatus as described herein for placement at a second location near the target region, wherein the second location opposes the first location; wherein when an AC voltage is applied between the first apparatus and the second apparatus, an AC electric field having a frequency ranging from 100 kHz to 500 kHz is imposed in the target region; and wherein when the AC electric field is imposed in the target region for an effective duration of time, the AC electric field selectively destroys or inhibits the growth of rapidly dividing cells within the target region.

A further aspect of the disclosure relates to a described apparatus for placement on or near a living subject or in vitro medium, for selectively destroying or inhibiting the growth of rapidly dividing cells in a target region of the subject or the in vitro medium. Also described herein is the use of a described apparatus for selectively destroying or inhibiting the growth of rapidly dividing cells. Further described herein is a kit comprising a disclosed apparatus together with one or more therapeutic agents useful for treating a condition associated with rapidly dividing cells.

BRIEF DESCRIPTION OF THE DRAWINGS

FIGS. 1A and 1B are front and side views of a first embodiment of an electrode that is used for applying TTFields to a person's body.

FIGS. 2A and 2B depict front and side views of a transducer array that is implemented using a flex circuit.

FIGS. 3A, 3B, and 3C depict front, side, and exploded views of another transducer array that is implemented using a flex circuit.

Various embodiments are described in detail below with reference to the accompanying drawings, wherein like reference numerals represent like elements.

DETAILED DESCRIPTION

Figure 4B:
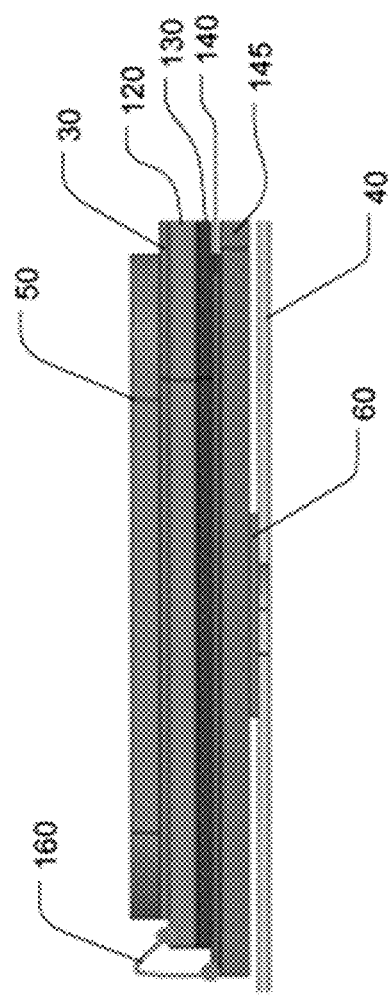
FIGS. 4A and 4B depict front and side views of another transducer array that is implemented using a flex circuit.

FIGS. 1A and 1B are front and side views of a simple embodiment of an electrode 10 that is used for applying TTFields to a person's body. In all embodiments described herein, the front of an electrode or transducer array is the side that faces the person's body, and the rear of the electrode or transducer array is the opposite side.

Each electrode 10 has a layer of conductive material 20, which is preferably made from a thin (e.g., with a thickness of less than 0.3 mm, or in some embodiments less than 0.1 mm) and flexible piece of metal foil (e.g., copper, stainless steel, etc.). In some embodiments, the thickness of the layer of conductive material 20 is uniform. In alternative embodiments, the thickness could be non-uniform. The conductive material 20 has a front face, and this front face has an area A. An electrical lead 70 is positioned in electrical contact with the layer of conductive material 20, and the electrical lead 70 exits via the rear of the electrode 10.

Each electrode 10 also has a flexible polymer layer 30 positioned against the front face of the conductive material 20 so as to cover the area A. Optionally, the flexible polymer layer 30 may also cover the side edges of the conductive material 20, as depicted in FIG. 1B. (When the polymer layer 30 does not cover the side edges of the conductive material 20, it is preferable to cover the side edges with an appropriate insulator such as a medical grade silicone to prevent non-capacitive coupling between the conductive material 20 and the patient's body.) The polymer layer 30 is an insulator, and the polymer layer 30 has a front face. In some preferred embodiments, the polymer layer 30 comprises poly(vinylidene fluoride-trifluoroethylene-chlorotrifluoroethylene) and/or poly(vinylidene fluoride-trifluoroethylene-1-chlorofluoroethylene). Those two polymers are abbreviated herein as "Poly(VDF-TrFE-CTFE)" and "Poly(VDF-TrFE-CFE)," respectively. These embodiments are particularly advantageous because the dielectric constant of these materials is on the order of 40. In some embodiments, the polymer used in the insulating layer can be poly(vinylidene fluoride-trifluoroethylene-chlorotrifluoroethylene-chlorofluoroethylene) or "Poly(VDF-TrFE-CTFE-CFE)."

In some embodiments, the terpolymer used in the insulating polymer layer can comprise VDF, TrFE, CFE and/or CTFE in any suitable molar ratio. Suitable terpolymers include those, for example, having 30 to 80 mol % VDF, 5 to 60 mol % TrFE, with CFE and/or CTFE constituting the balance of the mol % of the terpolymer. In further embodiments, the terpolymer comprises 40 to 70 mol % VDF, 20 to 50 mol % TrFE, with CFE and/or CTFE constituting the balance of the mol % of the terpolymer. In still further embodiments, VDF and TrFE constitutes 80 to 97 mol % of the terpolymer, and CFE and/or CTFE constitutes the remainder, i.e., 3 to 20 mol %. In other embodiments, VDF and TrFE constitutes 90 to 95 mol % of the terpolymer, and CFE and/or CTFE constitutes the remainder, i.e., 5 to 10 mol %. For example, the terpolymer can comprise 61.8 mol % VDF, 29.8 mol % TrFE, and 8.5 mol % CFE and/or CTFE.

In further embodiments, suitable terpolymers used in the insulating polymer layer include those, for example, having 30 to 80 mol % VDF, 5 to 60 mol % TrFE, with CTFE constituting the balance of the mol % of the terpolymer. In some embodiments, the terpolymer comprises 40 to 70 mol % VDF, 20 to 50 mol % TrFE, with CTFE constituting the balance of the mol % of the terpolymer. In still further embodiments, VDF and TrFE constitutes 80 to 97 mol % of the terpolymer, and CTFE constitutes the remainder, i.e., 3 to 20 mol %. In other embodiments, VDF and TrFE constitutes 90 to 95 mol % of the terpolymer, and CTFE constitutes the remainder, i.e., 5 to 10 mol %. For example, the terpolymer can comprise 61.8 mol % VDF, 29.8 mol % TrFE, and 8.5 mol % CTFE.

According to various embodiments, the terpolymers can have an average molecular weight of greater than 400,000 g/mol, as measured by viscometry. For example, the terpolymers can have an average molecular weight equal to about 413,000, as measured by viscometry at 20° C. using methyl ethyl ketone as solvent. In some embodiments, the terpolymers can be powder form, free of any crust or skin, before forming the polymer into the insulating layer.

Polymers comprising VDF, TrFE, CFE, and/or CTFE can be made according to methods known in the art. In some embodiments, such polymers can be prepared according to the following process. An initial mixture of VDF and TrFE (free of CFE and CTFE) can be fed into an autoclave or other suitable reactor that can be pressurized. An initiator mixed with water can be injected into the autoclave to achieve a suitable pressure, e.g., at least 80 bar, to thereby form a suspension of VDF and TrFE monomers in water. A secondary mixture comprising VDF, TrFE, and CFE and/or CTFE can then be injected into the autoclave. In some embodiments, when the polymerization reaction begins, the secondary mixture can be reinjected continuously into the autoclave such that a constant pressure of at least 80 bar is maintained.

In some embodiments, the initial mixture fed into the autoclave can comprise 25% to 95% by weight VDF (e.g., 55 to 80% by weight VDF), and 5% to 75% by weight TrFE (e.g., 20% to 45% by weight TrFE). The secondary mixture can comprise 20% to 80% VDF by weight (e.g., 35% to 70% VDF), 3% to 60% TrFE by weight (e.g., 14% to 40% TrFE), and 4% to 67% CFE and/or CTFE by weight (e.g., 7% to 34% CFE and/or CTFE). In some embodiments, the weight ratio of the initial mixture and the secondary mixture ranges from about 0.4 to about 2.

In some embodiments, the pressure inside the autoclave or reaction can be between about 80 bar and 110 bar. A reaction temperature of between 40° C. and 60° C. can be maintained. In some embodiments, the secondary mixture of VDF, TrFE, and CFE and/or CTFE can be reinjected continuously into the autoclave or reactor, for example through a gate having a non-return valve. The secondary mixture can in some embodiments be compressed using two compressors in series before being reinjected into the autoclave. As is known, the secondary mixture can be injected into the autoclave under a pressure greater than that prevailing in the autoclave, i.e., at values above 80 bar.

Other polymers comprising VDF, TrFE, CFE, and/or CTFE are also contemplated for use in the insulating polymer layer. For example, polymers comprising 50-80 mol % VDF, 15-40 mol % TrFE, and 2-20 mol % of CFE and/or CFTE can be used. Such polymers can have a number average molecular weight in excess of about 10,000 g/mol, e.g., greater than 30,000 g/mol. Polymers of such compositions are described in U.S. Pat. No. 6,355,749, which is incorporated by reference in its entirely for its teachings VDF, TrFE, and CFE/CTFE-containing polymers and methods of preparing them.

Referring again to FIG. 1, because the TTFields are capacitively coupled through the electrode 10, and because capacitance is inversely proportional to the thickness of the dielectric layer, the polymer layer 30 is preferably thin (e.g., in some embodiments, 20 µm or less, in other embodiments, 10 µm or less, and in still other embodiments, 5 µm or less). In general, as the thickness of the polymer layer 30 increases, voltage applied to the subject through the apparatus is wasted.

On the other hand, the polymer layer 30 should not be too thin because that could impair manufacturability, compromise the layer's structural integrity, and risk dielectric breakdown when the AC signals are applied. In some embodiments, the polymer layer 30 has a thickness that is at least 1 µm. In some embodiments the polymer layer 30 is between 1-3 µm thick (e.g., about 2 µm), which provides a balance between the parameters noted above. The thickness of the polymer layer 30 can be uniform. In alternative embodiments, the thickness can be non-uniform.

In the FIG. 1A/B embodiment, the electrode 10 is affixed to the skin on a person's body using a flexible third layer 40 positioned behind the layer of conductive material 20. The flexible third layer 40 has a front face, and at least a portion of the front face of the third layer is coated with an adhesive 42. A first region of the adhesive 42 is positioned directly behind the layer of conductive material 20, and this region of the adhesive 42 supports the layer of conductive material 20. Note that direct contact between the first region of the adhesive 42 and the layer of conductive material 20 is not required, and additional components or layers (not shown) may be positioned between those two components 20, 42. A second region of the adhesive 42 is positioned outwardly with respect to the first region and is configured to (a) when pressed against a region of skin, adhere to the skin and hold the polymer layer adjacent to the skin, and (b) be easily removable from the skin. The flexible third layer 40 therefore resembles a bandage in these embodiments.

Optionally, the embodiments that include the flexible third layer 40 also have a thin layer of conductive hydrogel (not shown) disposed on the front face of the polymer layer 30. This layer of conductive hydrogel is positioned to make contact with the skin when the polymer layer 30 is being held adjacent to the skin by the second region of the adhesive 42.

During use, a first electrode 10 will typically be positioned on the person's skin on one side of the tumor, and a second electrode 10 will be positioned on the person's skin on the opposite side of the tumor. For example, in the context of a brain tumor positioned in the center of a person's head, the first electrode 10 could be positioned on the right side of the person's head, and the second electrode 10 could be positioned on the left side of the person's head. For both of the electrodes 10, the front of the electrode 10 faces the person's skin, which means that the polymer layer 30 faces the person's skin. When pressed against the skin, the second region of the adhesive 42 adheres to the skin and holds the polymer layer adjacent to the skin. When the layer of conductive hydrogel is provided, the hydrogel is disposed between the polymer layer 30 and the person's skin. When the layer of conductive hydrogel is omitted (which is less preferable), the polymer layer 30 will rest directly on the person's skin.

After the pair of electrodes 10 has been affixed to the person's skin, an AC voltage is applied between those two electrodes 10. The layer of conductive material 20 acts as a capacitor's plate, and the polymer layer 30 acts as a capacitor's insulating layer, and an AC electric field will be capacitively coupled through the pair of electrodes 10 into the person's body.

Optionally, ceramic nanoparticles may be mixed into the Poly(VDF-TrFE-CTFE), Poly(VDF-TrFE-CFE), and/or Poly(VDF-TrFE-CFE-CTFE) to form a "nanocomposite." Optionally, these ceramic nanoparticles may comprise ferroelectric metal oxides (e.g., at least one of barium titanate and barium strontium titanate).

In alternative embodiments, instead of forming the polymer layer 30 from Poly(VDF-TrFE-CTFE) and/or Poly (VDF-TrFE-CFE), a different polymer that provides a high level of capacitance may be used. In some embodiments, other polymers can have the following properties: (1) at at least one frequency between 100 kHz and 500 kHz, the polymer layer has a dielectric constant of at least 20; and (2) the polymer layer has a thickness of 20 µm or less in a direction perpendicular to the front face of the polymer layer. In some embodiments, the thickness of the polymer layer multiplied by its dielectric strength is at least 50 V, and in some embodiments this value is at least 200 V. Example of alternative polymers that can be used in place of Poly (VDF-TrFE-CTFE) and/or Poly(VDF-TrFE-CFE) include the following: (1) ceramic nanoparticles mixed into at least one of Poly(VDF-TrFE), P(VDF-HFP), PVDF, or other polymers; and (2) barium titanate and/or barium strontium titanate ceramic nanoparticles mixed into at least one of Poly(VDF-TrFE), P(VDF-HFP), PVDF. In other embodiments, the polymer layer 30 is formed by mixing ceramic nanoparticles into at least one other polymer (i.e., a polymer not listed above in this paragraph).

In some embodiments, the thickness of the polymer layer is 10 µm or less, e.g., from 1 µm to 10 µm, and in some embodiments, the thickness of the polymer layer is 5 µm or less, e.g., from 1 µm to 5 µm. In some embodiments, the thickness of the polymer layer multiplied by its dielectric strength of at least 400 V. In some embodiments, the polymer layer has a dielectric constant of at least 20 measured at 200 kHz. Note that the values for dielectric constant and breakdown voltage specified herein are specified within a temperature range of 30-42° C., for example 35-42° C. or 38-41° C., and the values of those parameters outside that temperature range are less relevant.

In some embodiments, the layer of conductive material comprises at least one metal (e.g. stainless steel, gold, and/or copper), is flexible, and has a thickness of less than 0.3 mm in a direction perpendicular to the front face of the layer of conductive material. In some embodiments, the thickness of the conductive material is less than 0.1 mm.

These embodiments may be affixed to a person's skin using a flexible third layer that resembles a bandage. One approach for using a flexible third layer to affix the electrode 10 to a person's skin is to position the flexible third layer 40 behind the layer of conductive material. The flexible third layer 40 has a front face, and at least a portion of the front face of the third layer is coated with an adhesive 42. A first region of the adhesive 42 is positioned directly behind the layer of conductive material 20 and supports the layer of conductive material. (Note that direct contact is not required, and intervening components may be disposed therebetween.) A second region of the adhesive 42 is positioned outwardly with respect to the first region and is configured to (i) when pressed against a region of skin, adhere to the skin and hold the polymer layer adjacent to the skin, and (ii) be easily removable from the skin. A layer of conductive hydrogel (not shown) is disposed on the front face of the polymer layer 30, and the hydrogel is positioned to make contact with the skin when the polymer layer 30 is being held adjacent to the skin by the second region of the adhesive 42.

Another approach for using a flexible third layer to affix the electrode 10 to a person's skin is to configure the flexible third layer 40 to support the layer of conductive material 20. In these embodiments, the flexible third layer 40 has a front face. A first portion of the front face of the flexible third layer 40 is coated with an adhesive 42 that adheres to human skin and is easily removable from the skin. The first portion is positioned outwardly with respect to both the layer of conductive material 20 and the polymer layer 30 such that when the first portion is pressed against a region of skin, the adhesive 42 on the first portion will adhere to the skin and hold the polymer layer 30 adjacent to the skin. A layer of conductive hydrogel (not shown) is disposed on the front face of the polymer layer 30. The hydrogel is positioned to make contact with the skin when the polymer layer 30 is being held adjacent to the skin by the adhesive 42.

FIGS. 2A and 2B depict front and side views of another embodiment that implements a transducer array using a flex circuit. This embodiment is used for applying an alternating electric field to a living subject or an in vitro medium at a frequency between 100 kHz and 500 kHz. This FIG. 2 embodiment has a flex circuit that includes (a) a plurality of conductive pads 20 positioned on a front side of the flex circuit 25. Each of the conductive pads 20 has an area. At least one conductive trace (not shown) is disposed in electrical contact with the plurality of conductive pads 20. The at least one conductive trace is arranged so that each of the conductive pads 20 can be driven by an electrical signal.

This embodiment also has a plurality of flexible polymer regions 30. These flexible polymer regions 30 could be regions within a single contiguous sheet of polymer material, as depicted in FIG. 2A. Alternatively, these regions 30 could be discrete sections of flexible polymer that are separated by gaps. Each of the flexible polymer regions 30 has a front face and is disposed over and in front of a respective one of the conductive pads 20 on the front side of the flex circuit 25.

The polymer regions 30 in this embodiment can have the following properties: (1) at at least one frequency between 100 kHz and 500 kHz, each of the polymer regions 30 has a dielectric constant of at least 20; and (2) each of the polymer regions 30 has a thickness of 20 µm or less in a direction perpendicular to its front face. In some embodiments, the thickness of each of the polymer regions 30 multiplied by its dielectric strength is at least 50 V, and in some embodiments this value is at least 200 V. Any of the polymer materials discussed above in connection with the FIG. 1 embodiments may be used to implement the polymer regions 30 in this FIG. 2 embodiment.

In some embodiments of FIG. 2, each of the polymer regions independently has a thickness of 20 µm or less in a direction perpendicular to its front face, e.g., from 1 µm to 20 µm. In further embodiments of FIG. 2, each of the polymer regions independently has a thickness of 10 µm or less in a direction perpendicular to its front face, e.g., from 1 µm to 10 µm. In other embodiments of FIG. 2, each of the polymer regions independently has a thickness of 5 µm or less in a direction perpendicular to its front face, e.g., from 1 µm to 5 µm. In further embodiments of FIG. 2, each of the polymer regions independently has a thickness of 3 µm or less in a direction perpendicular to its front face, e.g., from 1 µm to 3 µm.

In this FIG. 2 embodiment, the plurality of polymer regions 30 can be printed, sprayed, or cast directly onto the plurality of conductive pads 20, which makes it much easier to obtain a thin polymer layer. In some embodiments (e.g., in those embodiments where the polymer regions 30 are printed, sprayed, or cast directly onto the conductive pads 20), the polymer regions have a thickness of 5 µm or less, e.g., 1 µm to 5 µm.

Increasing the total area that is covered by the conductive pads 20 will increase the capacitance of the overall device. In some embodiments, the areas of the plurality of conductive pads 20 collectively add up to at least 25 cm$^2$.

The FIG. 2 embodiments may be affixed to a person's skin using a flexible third layer that resembles a bandage. In these embodiments, a flexible third layer 40 is positioned behind the flex circuit 25. The flexible third layer 40 has a front face. At least a portion of the front face of the third layer 40 is coated with an adhesive. A first region of the adhesive is positioned directly behind the flex circuit 25 and supports the flex circuit 25, and a second region of the adhesive is positioned outwardly with respect to the first region. (This is the portion that is not covered by the flex circuit in FIG. 2A.) This second region is configured to, when pressed against a region of skin, adhere to the skin and hold the plurality of polymer regions 30 adjacent to the skin. The adhesive used in the second region should also be easily removable from the skin. Although the flexible third layer 40 holds the plurality of polymer regions 30 adjacent to the skin, a layer of conductive hydrogel 50 may be interposed between the polymer regions 30 and the skin, and the relationship between the polymer regions 30 and the skin would nevertheless be considered "adjacent." (This applies to this FIG. 2 embodiment as well as to other embodiments described herein). In this situation, the layer of hydrogel 50 is disposed on the front face of each of the polymer regions 30. The hydrogel 50 is positioned to make contact with the skin when each of the polymer regions 30 is being held adjacent to the skin by the second region of the adhesive.

In a variation of the FIG. 2 embodiments, a different approach is used to hold the polymer regions adjacent to the skin using a flexible third layer. In these embodiments, the flexible third layer is configured to support the flex circuit. The flexible third layer has a front face, and optionally can include a plurality of cut-out open regions that correspond to the positions of the conductive pads 20. A first portion of the front face of the flexible third layer is coated with an adhesive that adheres to human skin and is easily removable from the skin. This first portion is positioned outwardly with respect to the flex circuit 25 such that when the first portion is pressed against a region of skin, the adhesive on the first portion will adhere to the skin and hold the plurality of polymer regions 30 adjacent to the skin. As in the previous embodiments, a layer of conductive hydrogel 50 may be disposed on the front face of each of the polymer regions 30. The hydrogel 50 is positioned to make contact with the skin when each of the polymer regions 30 is being held adjacent to the skin by the adhesive.

A plurality of thermistors may be incorporated into this FIG. 2 embodiment. One way to accomplish this is to position the plurality of thermistors 60 on the rear side of the flex circuit 25 (i.e., between the flex circuit 25 and the flexible third layer 40), with each of the plurality of thermistors 60 positioned in thermal contact with a respective one of the plurality of conductive pads 20. In these embodiments, the flex circuit 25 further includes a plurality of conductive traces that provide access to the plurality of thermistors 60. In alternative embodiments (not shown), the thermistors 60 could be positioned between the conductive pads 20. However, in this case an additional insulation should be provided in front of the thermistors.

FIGS. 3A, 3B, and 3C depict front, side, and exploded views of another embodiment that implements a transducer array using a flex circuit. This embodiment is also used for applying an alternating electric field to a living subject or an in vitro medium at a frequency between 100 kHz and 500 kHz. But instead of using conductive pads that are integrated into the flex circuit (as in the FIG. 2 embodiment described above), the FIG. 3 embodiments relies on a plurality of pieces of metal foil that are positioned in front of the flex circuit and electrically connected to respective pads of the flex circuit.

The FIG. 3 embodiment has a flex circuit 145 that includes (a) a plurality of conductive pads 140 positioned on a front side of the flex circuit 145, and (b) at least one conductive trace (not shown) disposed in electrical contact with the plurality of conductive pads 140. The at least one conductive trace is arranged so that each of the conductive pads 140 can be driven by an electrical signal. A plurality of pieces of metal foil 120 are positioned in front of the flex circuit 145, and each of those pieces 120 has a front face having an area. Each of the pieces 120 is electrically connected to a respective one of the conductive pads 140.

The electrical connection between each of the pieces 120 and a respective one of the conductive pads 140 may be implemented as depicted in FIG. 3B by positioning an insulating layer 130 between each of the pieces 120 and the corresponding conductive pad 140. The insulating layer 130 in this FIG. 3B embodiment has an opening behind each of the plurality of pieces of metal foil 120 and a conductive path (e.g., metal, solder, etc.) is provided through this opening.

All variations of the FIG. 3 embodiment also have a plurality of flexible polymer regions 30, each of which has a front face and is disposed over and in front of a respective one of the plurality of pieces of metal foil 120. The polymer regions 30 in this embodiment can have the following properties: (1) at at least one frequency between 100 kHz and 500 kHz, each of the polymer regions 30 has a dielectric constant of at least 20; and (2) each of the polymer regions 30 has a thickness of 20 µm or less in a direction perpendicular to its front face. In some embodiments, the thickness of each of the polymer regions 30 multiplied by its dielectric strength is at least 50 V, and in some embodiments this value is at least 200 V. Any of the polymer materials discussed above in connection with the FIG. 1 embodiments may be used to implement the polymer regions 30 in this FIG. 3 embodiment.

In some embodiments of FIG. 3, each of the polymer regions independently has a thickness of 20 µm or less in a direction perpendicular to its front face, e.g., from 1 µm to 20 µm. In further embodiments of FIG. 3, each of the polymer regions independently has a thickness of 10 µm or less in a direction perpendicular to its front face, e.g., from 1 µm to 10 µm. In other embodiments of FIG. 3, each of the polymer regions independently has a thickness of 5 µm or less in a direction perpendicular to its front face, e.g., from 1 µm to 5 µm. In further embodiments of FIG. 3, each of the polymer regions independently has a thickness of 3 µm or less in a direction perpendicular to its front face, e.g., from 1 µm to 3 µm.

In this FIG. 3 embodiment, the plurality of polymer regions 30 can be printed, sprayed, or cast directly onto the pieces of metal foil 120, which makes it much easier to obtain a very thin polymer layer. In some embodiments (e.g., in those embodiments where the polymer regions 30 are printed, sprayed, or cast directly onto the pieces of metal foil 120), the polymer regions have a thickness of less than 5 µm.

Increasing the total area that is covered by the pieces of metal foil 120 will increase the capacitance of the overall device. In some embodiments, the areas of the plurality of pieces of metal foil collectively add up to at least 25 $cm^2$.

The FIG. 3 embodiments may be affixed to a person's skin using a flexible third layer 40, the nature of which is similar to the flexible third layer described above in connection with the FIG. 2 embodiments. Additionally, a layer of conductive hydrogel 50 may be disposed on the front face of each of the polymer regions, as described above in connection with the FIG. 2 embodiments.

A plurality of thermistors may also be incorporated into this FIG. 3 embodiment, as described above in connection with the FIG. 2 embodiments.

Figure 4A:
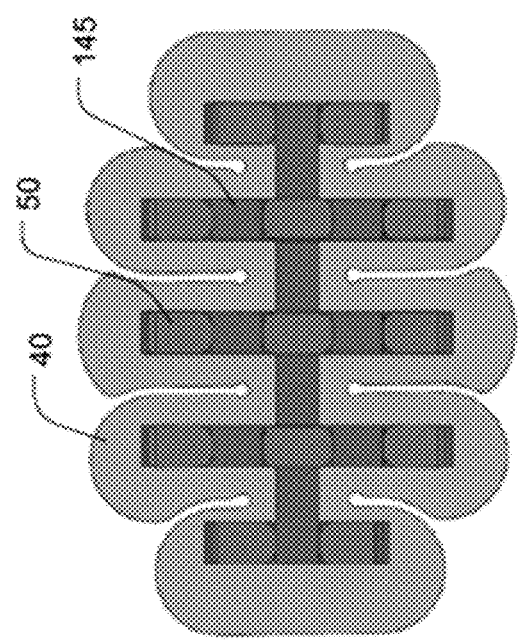

FIGS. 4A and 4B is similar to the FIG. 3 embodiment described above, except that it uses an alternative approach for implementing the electrical connection between each of the pieces 120 and a respective one of the conductive pads 140. As in the FIG. 3 approach, an insulating layer 130 is positioned between each of the pieces 120 and the corresponding conductive pad 140. But the insulating layer 130 in this FIG. 4 embodiment does not have openings behind each of the plurality of pieces of metal foil 120. Instead, the insulating layer 130 in this FIG. 4 embodiment is continuous. The electrical connection between each of the pieces of metal foil 120 and the conductive pads 140 of the flex circuit is made using a side or edge electrical connection 160 between the conductive pads 140 and the pieces of metal foil 120.

The embodiments described herein can advantageously provide large areas of coverage. And because heat will be dissipated over a larger area of skin, these embodiments can deliver more energy to the patient's body without exceeding safety requirements at any given location of the person's skin. The embodiments described herein are also thinner, lighter, and more flexible than the prior art ceramic-disc-based embodiments. This will make the transducer arrays more comfortable, which should increase compliance and make it easier for patients to use the device during a larger portion of each day. In addition, because the embodiments described above are thinner and lighter, lower strength adhesives can be used, which should result in reduced skin irritation.

The described embodiments are useful for, among other things, selectively destroying or inhibiting the growth of rapidly dividing cells located within a target region of a subject or an in vitro medium, e.g., an in vitro medium comprising stem cells for later implantation into a subject. As described above, the treatment method can comprise positioning a first apparatus as described herein at a first location near the target region (e.g., on the subject's skin in the vicinity of the target region or near the target region of an in vitro medium). A second apparatus as described herein, which can be the same or different as the first apparatus, can be positioned at a second location near the target region. The second location opposes or generally opposes the first location such that an electric field having a suitable orientation can be applied to the target region.

An AC voltage can be applied between the first apparatus and the second apparatus, thereby imposing an AC electric field in the target region. The frequency of the AC electric field can range from 100 kHz to 500 kHz. When the AC electric field is imposed in the target region for a duration of time, the AC electric field selectively destroys or inhibits the growth of rapidly dividing cells within the target region of the subject or the in vitro medium.

The term "subject" includes a vertebrate, such as a mammal, a fish, a bird, a reptile, or an amphibian. Thus, the subject can be a human, non-human primate, horse, pig, rabbit, dog, sheep, goat, cow, cat, guinea pig or rodent. The term does not denote a particular age or sex. In one aspect, the subject is a mammal. In some aspects, the subject is a living human subject. In some aspects, the subject has been diagnosed with a need for treatment of a condition involving the growth of rapidly dividing cells prior to the treatment method. In further aspects, the treatment method further comprises the step of identifying a subject in need of the treatment method.

The duration of time that the AC electric field is applied to the target region will vary depending on the condition treated. In some aspects, the duration of time can be determined based on when a therapeutically significant portion of the rapidly dividing cells die. For example, the duration of time can range from hours to days, e.g., from 1 to 48 hours, or longer, e.g., from 2 to 14 days.

The rapidly dividing cells, in some aspects, can be present in a tumor located in the target region. The term "tumor" refers to a malignant tissue comprising transformed cells that grow uncontrollably. Tumors include leukemias, lymphomas, myelomas, plasmacytomas, and the like; and solid tumors. Examples of solid tumors that can be treated with the method described herein include sarcomas and carcinomas such as, but not limited to: fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, meningioma, melanoma, neuroblastoma, and retinoblastoma. Because each of these tumors undergoes rapid growth, any one can be treated in accordance with the method. The method is particularly advantageous for treating brain tumors, which are difficult to treat with surgery and radiation, and often inaccessible to chemotherapy or gene therapies. In addition, the method is suitable for use in treating skin and breast tumors because of the ease of localized treatment provided by the method.

In some aspects, the method can be used to treat a variety of cancers present in the target region, including without limitation gliobastoma (including recurrent and newly-diagnosed glioblastoma), mesothelioma, brain metastasis, non-small cell lung cancer, pancreatic cancer, ovarian cancer, liver cancer, breast cancer, cervical cancer, colorectal carcinoma, ependymoma, gastric adenocarcinoma, gliosarcoma, malignant melanoma, medulloblastoma, meningioma, renal adenocarcinoma, small cell lung cancer, urinary transitional cell carcinoma, and teratoma which can be present in a living subject or an in vitro medium such as a medium comprising stem cells for later implantation into a subject.

In addition, the described treatment method can control uncontrolled growth associated with non-malignant or pre-malignant conditions, and other disorders involving inappropriate cell or tissue growth by application of an electric field to the tissue undergoing inappropriate growth. For example, the method can be useful for the treatment of arteriovenous (AV) malformations, particularly in intracranial sites. The method can also be used to treat psoriasis, a dermatologic condition that is characterized by inflammation and vascular proliferation; and benign prostatic hypertrophy, a condition associated with inflammation and possibly vascular proliferation. Treatment of other hyperproliferative disorders is also contemplated.

Furthermore, undesirable fibroblast and endothelial cell proliferation associated with wound healing, leading to scar and keloid formation after surgery or injury, and restenosis after angioplasty or placement of coronary stents can be inhibited by application of an electric field in accordance with the described method. The non-invasive nature of the method makes it particularly desirable for these types of conditions, particularly to prevent development of internal scars and adhesions, or to inhibit restenosis of coronary, carotid, and other important arteries.

In addition to treating tumors that have already been detected, the described embodiments can also be used prophylactically to prevent tumors from ever reaching a detectable size. This mode of usage can be helpful for people who are at high risk for a particular type of cancer (e.g., women with a strong history of breast cancer in their families, or people who have survived a bout of cancer and are at risk of a relapse). The course of prophylactic treatment can be tailored based on the type of cancer being targeted and/or to suit the convenience of the patient.

Further details of the treatment method are described in U.S. Pat. Nos. 7,016,725 and 7,565,205, each of which is incorporated herein by reference in its entirety for its teachings of using TTFields to treat and prevent tumors and other conditions involving rapidly dividing cells.

In further aspects, the described embodiments are useful for selectively destroying or inhibiting the growth of rapidly dividing cells located within a target region of an in vitro medium. For example, stem cells being cultured for later implantation into a subject can grow a teratoma during development. Such teratomas are associated with rapidly dividing cells, and thus the disclosed methods can be useful for reducing, eliminating, or preventing such teratomas from developing within the in vitro stem cell medium, which may later be implanted into a living subject.

In still further aspects, the described embodiments are useful for selectively destroying or inhibiting the growth of rapidly dividing viral or bacterial cells located within a target region of a subject or an in vitro medium. The described embodiments can be used to treat viral or bacterial infections in a subject or an in vitro medium, for example as described in U.S. Patent Publication No. 2020/0016399, which is incorporated by reference in its entirety for its teachings of the use of AC electric fields for antiviral purposes. In some aspects, for instance, the described embodiments can be used in anti-viral or anti-bacterial methods in combination with an effective dose of an anti-viral or antibacterial agent while the AC electric field is applied to the target region. In further aspects, by applying an AC electric field to a target region characterized by rapidly dividing bacterial or viral cells, the AC electric field can enable an effective therapeutic dose of an antibacterial or antiviral agent to reach the target region and perform in a therapeutically-effective manner.

Similarly, in some aspects, applying AC electric fields to a target region characterized by rapidly dividing bacterial or viral cells can prevent the damage made by infection of new cells (alteration of cell's functions, cell death or transformation), stop viral or bacterial multiplication and spread, and avoid ramifications on the wellbeing of the infected subject. Likewise, the described embodiments can be useful for applying AC electric field therapy for the protection of uninfected healthy subjects from a threatening infection, like in the case of medical staff that come into close contact with infected individuals (especially in acute phases of viral diseases when infectious particles may be found in blood, skin lesions, saliva etc., and can be transmitted by direct or indirect contact, e.g., via droplets or aerosols). AC electric field therapy using the described embodiments can also be used by individuals with a suppressed immune system (like in cases of congenital immunodeficiency, organ transplant, cancer etc.), which lack the natural forceful defense of the body, and hence are sensitive to opportunistic infections.

Additionally, inhibition of viral infection could be useful for preventing the progression of an ongoing viral disease. Human immunodeficiency virus (HIV) is an example of a virus that remains clinically dormant in the human body for a long period of time, however, during this period the virus persists and replicates, particularly in lymph nodes. Over time the number of the susceptible immune cells decline following infection and AIDS (Acquired Immune Deficiency Syndrome) develops. Halting the continuous cycles of viral infection can seize the spread within and prevent the progression of the disease.

In further aspects, the described embodiments can be useful for treating a variety of autoimmune disorders, for example as described in U.S. Patent Publication No. 2020/0078582, which is incorporated by reference in its entirety for its teachings of using AC electric field therapy to treat or prevent the progression of autoimmune disorders.

In still further aspects, the described embodiments can be useful for treating a variety of disorders of the central nervous system. Such disorders are often characterized by rapidly dividing cell growth or the proliferation or accumulation of certain charged proteins and plaques, which can be disrupted by AC electric field therapy using the described embodiments. Non-limiting examples of such disorders include Alzheimer's disease, multiple sclerosis, neurofibromatosis, Parkinson's disease, among others. As described above, AC electric field therapy can be combined with pharmaceutical agents known for treating such disorders of the central nervous system. In some aspects, AC electric field therapy using a described embodiment can be useful for ensuring that a therapeutically effective amount of the pharmaceutical agent reaches the target region to be treated, e.g., the AC electric field therapy permits a therapeutically effective amount of a drug to cross the blood brain barrier and enter the target region.

Also described herein is disclosed apparatus for placement on or near a living subject or in vitro medium, for selectively destroying or inhibiting the growth of rapidly dividing cells in a target region of the subject or in vitro medium. Further described herein is the use of a disclosed apparatus for selectively destroying or inhibiting the growth of rapidly dividing cells. Additionally, described herein is a kit comprising a disclosed apparatus together with one or more therapeutic agents useful for treating a condition associated with rapidly dividing cells, e.g., an anticancer drug, an antiviral, an antibacterial, a drug useful for treating a central nervous system disorder or any other disorder associated with rapidly dividing cells.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus for applying an alternating electric field to a living subject, the apparatus comprising:
    a layer of conductive material having a skin-facing front face, the front face having an area;
    a flexible polymer layer disposed forward of the layer of conductive material and positioned against the skin-facing front face of the layer of conductive material so as to cover at least a portion of the area of the front face of the layer of conductive material, the polymer layer having a skin-facing front face; and
    an electrical lead positioned in electrical contact with the layer of conductive material,
    wherein the polymer layer comprises at least one polymer selected from Poly(VDF-TrFE-CTFE), Poly(VDF-TrFE-CFE), and Poly(VDF-TrFE-CFE-CTFE),
    wherein the apparatus is configured to apply the alternating electric field at a frequency between 100 kHz and 500 kHz and at a field intensity ranging from 0.1 V/cm to 10 V/cm to selectively destroy or inhibit the growth of rapidly dividing cells located within a target region of the subject.

2. The apparatus of claim 1, further comprising a flexible third layer positioned rearward of the layer of conductive material, the flexible third layer having a skin-facing front face,
    wherein at least a portion of the front face of the third layer is coated with an adhesive,
    wherein a first region of the adhesive of the third layer is positioned directly rearward of the layer of conductive material and supports the layer of conductive material, and
    wherein a second region of the adhesive is positioned outwardly with respect to the first region and is configured to (a) when pressed against a region of skin, adhere to the skin and hold the polymer layer adjacent to the skin, and (b) be removable from the skin.

3. The apparatus of claim 2, further comprising a layer of conductive hydrogel disposed on the front face of the polymer layer, wherein the layer of conductive hydrogel is positioned to make contact with the skin when the polymer layer is being held adjacent to the skin by the second region of the adhesive.

4. The apparatus of claim 1, wherein the polymer layer has a thickness of 20 μm or less.

5. The apparatus of claim 1, wherein the polymer layer has a thickness of 10 μm or less.

6. The apparatus of claim 1, wherein the polymer layer has a thickness of 5 µm or less.

7. The apparatus of claim 1, wherein the polymer comprises 30 mol % to 80 mol % VDF and 5 mol % to 60 mol % TrFE, with CFE and/or CTFE constituting the balance of the mol %.

8. The apparatus of claim 1, wherein the polymer layer comprises ceramic nanoparticles mixed into at least one of Poly(VDF-TrFE-CTFE), Poly(VDF-TrFE-CFE), and Poly(VDF-TrFE-CFE-CTFE).

9. The apparatus of claim 8, wherein the ceramic nanoparticles comprise at least one of barium titanate and barium strontium titanate.

10. The apparatus of claim 1, wherein the polymer layer comprises a plurality of flexible polymer regions.

11. The apparatus of claim 10, wherein the layer of conductive material comprises a plurality of conductive pads, and wherein the plurality of polymer regions is printed, sprayed, or cast directly onto the plurality of conductive pads.

12. The apparatus of claim 10, wherein each of the polymer regions independently has a thickness of 10 µm or less.

13. The apparatus of claim 10, wherein the layer of conductive material comprises a plurality of conductive pads, and wherein the areas of the plurality of conductive pads collectively add up to at least 25 cm$^2$.

14. The apparatus of claim 1, wherein the polymer comprises 30 mol % to 80 mol % VDF and 5 mol % to 60 mol % TrFE, with CFE and/or CTFE constituting the balance of the mol %, and wherein the polymer layer has a thickness of 10 µm or less.

15. The apparatus of claim 1, wherein the polymer layer comprises ceramic nanoparticles mixed into at least one of Poly(VDF-TrFE-CTFE), Poly(VDF-TrFE-CFE), and Poly(VDF-TrFE-CFE-CTFE), wherein the ceramic nanoparticles comprise at least one of barium titanate and barium strontium titanate.

16. A method of selectively destroying or inhibiting the growth of rapidly dividing cells located within a target region of a subject, comprising:
  a) positioning a first apparatus of claim 1 at a first location near the target region;
  b) positioning a second apparatus of claim 1 at a second location near the target region, wherein the second location opposes the first location; and
  c) applying an AC voltage between the first apparatus and the second apparatus, thereby imposing an AC electric field in the target region, wherein the frequency of the AC electric field ranges from 100 kHz to 500 kHz, wherein the AC electric field has a field intensity ranging from 0.1 V/cm to 10 V/cm, and wherein when the AC electric field is imposed in the target region for a duration of time, the AC electric field destroys or inhibits the growth of rapidly dividing cells within the target region.

17. The method of claim 16, wherein the rapidly dividing cells are present in a tumor.

18. The method of claim 16, wherein the rapidly dividing cells are cancer cells.

19. The apparatus of claim 1, wherein the layer of conductive material comprises metal foil.

20. The method of claim 16, wherein each of the first apparatus and the second apparatus has:
  a flexible third layer positioned rearward of the layer of conductive material, the flexible third layer having a skin-facing front face,
  wherein at least a portion of the front face of the third layer is coated with an adhesive,
  wherein a first region of the adhesive of the third layer is positioned directly rearward of the layer of conductive material and supports the layer of conductive material, and
  wherein a second region of the adhesive is positioned outwardly with respect to the first region,
  wherein the second region of the adhesive is pressed against a region of skin of the subject to adhere to the skin and hold the polymer layer adjacent to the skin, and
  wherein the second region of the adhesive is removable from the skin.

21. The apparatus of claim 1, wherein the polymer layer has a dielectric constant of at least 20 measured when the alternating electric field is provided at a frequency of 200 kHz and within a temperature range of 30° C. to 42° C.

22. The method of claim 16, wherein the polymer layer of the first apparatus has a dielectric constant of at least 20 measured when the alternating electric field is provided at a frequency of 200 kHz and within a temperature range of 30° C. to 42° C.

23. The apparatus of claim 21, wherein a thickness of the polymer layer multiplied by a dielectric strength of the polymer layer is at least 400 V.

* * * * *